(12) United States Patent
Wason

(10) Patent No.: US 9,604,378 B2
(45) Date of Patent: *Mar. 28, 2017

(54) MOVABLE BLADE RELEASE MECHANISM FOR A CUTTING TOOL

(71) Applicant: Hubbell Incorporated, Shelton, CT (US)

(72) Inventor: Peter Wason, Manchester, NH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/691,748

(22) Filed: Apr. 21, 2015

(65) Prior Publication Data

US 2015/0224660 A1    Aug. 13, 2015

Related U.S. Application Data

(63) Continuation of application No. 13/412,435, filed on Mar. 5, 2012, now Pat. No. 9,085,035.

(51) Int. Cl.
| | |
|---|---|
| *B26D 1/30* | (2006.01) |
| *B23D 21/04* | (2006.01) |
| *B23D 29/00* | (2006.01) |
| B23D 17/02 | (2006.01) |
| B26D 3/16 | (2006.01) |
| H02G 1/00 | (2006.01) |
| B23D 21/10 | (2006.01) |

(52) U.S. Cl.
CPC ............. *B26D 1/30* (2013.01); *B23D 21/04* (2013.01); *B23D 29/002* (2013.01); *B23D 17/02* (2013.01); *B23D 21/10* (2013.01); *B26D 3/16* (2013.01); *H02G 1/005* (2013.01); *Y10T 83/04* (2015.04); *Y10T 83/8786* (2015.04)

(58) Field of Classification Search
CPC ........................... Y10T 83/8786; Y10T 83/04
See application file for complete search history.

(56) References Cited

U.S. PATENT DOCUMENTS

| | | | |
|---|---|---|---|
| 3,210,844 | A | 10/1965 | Tontscheff |
| 3,922,783 | A | 12/1975 | Hayes |
| 4,644,650 | A | 2/1987 | Laux et al. |
| 4,677,748 | A | 7/1987 | Kobayashi |
| 5,184,404 | A | 2/1993 | Chen |
| 5,218,768 | A | 6/1993 | Putsch et al. |

(Continued)

OTHER PUBLICATIONS

European Search Report issued in Application No. 13275047.2-1709 dated Jul. 3, 2013.

*Primary Examiner* — Hwei C Payer
(74) *Attorney, Agent, or Firm* — Michael Best & Friedrich, LLP

(57) ABSTRACT

A cutting tool includes a fixed blade having a cutting surface and a movable blade having a cutting surface. The movable blade is rotatable between a receiving position in which the cutting surfaces are spaced and a cutting position in which an object disposed between the fixed and movable blades is cut by the cutting surfaces. A return spring member is connected to the movable blade. The spring member stores energy when the movable blade is rotated from the receiving position to the cutting position. The spring member returns the movable blade to the receiving position when the stored energy is released.

7 Claims, 11 Drawing Sheets

(56) References Cited

U.S. PATENT DOCUMENTS

| | | | |
|---|---|---|---|
| 5,642,566 A | 7/1997 | Hirabayashi | |
| 6,085,422 A | 7/2000 | Hirabayashi | |
| 6,178,643 B1 | 1/2001 | Erbrick et al. | |
| 6,681,492 B1 | 1/2004 | Huang | |
| 6,766,581 B2 | 7/2004 | Nordlin | |
| 7,127,819 B1 | 10/2006 | Huang | |
| 8,261,453 B2 | 9/2012 | Huang | |
| 9,085,035 B2 * | 7/2015 | Wason | B23D 29/002 |
| 2009/0071013 A1 | 3/2009 | Hartranft et al. | |
| 2010/0325894 A1 | 12/2010 | Scott et al. | |
| 2011/0005083 A1 * | 1/2011 | Scott | B23D 21/00 30/92 |
| 2011/0219626 A1 | 9/2011 | Broeker et al. | |
| 2011/0258859 A1 | 10/2011 | Schofield et al. | |
| 2013/0227843 A1 | 9/2013 | Wason | |
| 2015/0224660 A1 * | 8/2015 | Wason | B23D 29/002 83/13 |

* cited by examiner

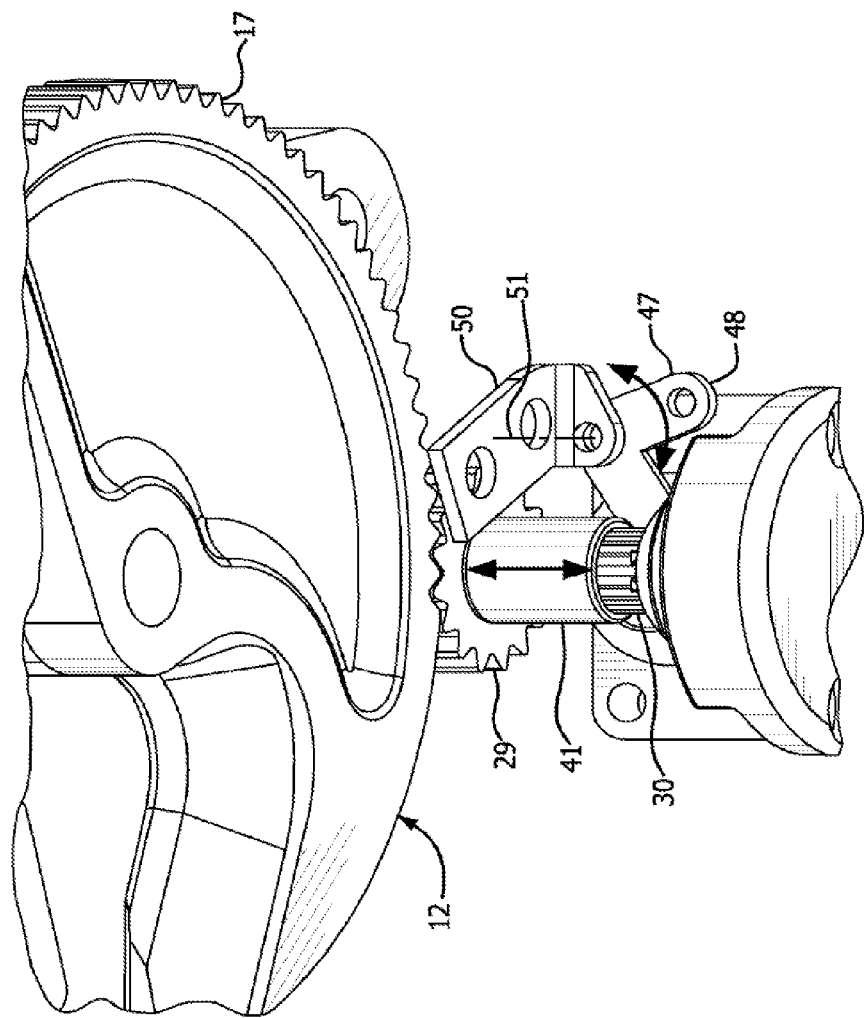

MOVABLE BLADE RELEASE MECHANISM FOR A CUTTING TOOL

FIELD OF THE INVENTION

The present invention relates to a movable blade release mechanism for a cutting tool. More particularly, the present invention relates to a cutting tool having a spring member that stores energy during operation such that when the stored energy is released a movable blade is returned to its initial position. Still more particularly, the present invention relates to a cutting tool in which a pinion gear is movable between first and second positions, such that energy is stored in a spring member when the pinion gear is in the first position and energy stored in the spring member is released when the pinion gear is in the second position.

BACKGROUND OF THE INVENTION

Conventional cutting tools rotate a movable blade relative to a fixed blade to cut a cable. The movable blade is rotated from an initial position toward the fixed blade to cut the cable positioned between the two blades. After the cable is cut, the movable blade is rotated back to the first position. The cutting process includes those two movements: advancing the movable blade toward the fixed blade, and returning the movable blade to its initial position. An important performance feature of cutting tools is the speed at which the cutting process can be conducted. Conventional cutting tools neglect the speed at which the movable blade is returned to its initial position after cutting a cable such that another cutting process can be conducted. Accordingly, a need exists for a cutting tool in which the movable blade is quickly returned to its initial position after cutting a cable.

SUMMARY OF THE INVENTION

Accordingly, a primary objective of the present invention is to provide an improved cutting tool for cutting a cable.

A further objective of the present invention is to provide an improved cutting tool in which the movable blade is quickly returned to its initial position after cutting a cable.

The foregoing objectives are basically attained by a cutting tool including a fixed blade having a first cutting surface and a movable blade having a second cutting surface. The movable blade is rotatable between a first position in which the second cutting surface is spaced from the first cutting surface of the fixed blade and a second position in which a cable disposed between the fixed and movable blades is cut by the first and second cutting surfaces. A return spring member is connected to the movable blade. The return spring member stores energy when the movable blade is rotated from the first position to the second position. The return spring member returns the movable blade to the first position when the stored energy is released. Accordingly, the movable blade is quickly returned to the first position such that another cutting process can be performed.

The foregoing objectives are also basically attained by a cutting tool including a fixed blade and a movable blade having a plurality of teeth. The movable blade is rotatable between a first position spaced from the fixed blade to receive an object therebetween and a second position adjacent the fixed blade to cut the object disposed between the fixed and movable blades. A drive pinion gear is movable between a drive position engaging the plurality of teeth of the movable blade and a return position disengaged from the plurality of teeth. The drive pinion gear rotates the movable blade from the first position to the second position in the drive position. A return spring member is connected to the movable blade to store energy when the movable blade is rotated from the first position to the second position and to release the stored energy to return the movable blade when the drive pinion gear is moved to the return position, thereby rotating the movable blade back to the first position. Accordingly, the movable blade is quickly returned to the first position such that another cutting process can be performed.

The foregoing objectives are also basically attained by a method of operating a cutting tool. A movable blade is rotated from a first position to a second position to cut a cable. A drive pinion gear is disengaged from the movable blade. The movable blade is rotated back to the first position after disengaging the drive pinion gear from the movable blade. Accordingly, the movable blade is quickly returned to the first position such that another cutting process can be performed.

Other objects, advantages and salient features of the invention will become apparent from the following detailed description, which, taken in conjunction with the annexed drawings, discloses preferred embodiments of the invention.

As used in this application, the terms "front," "rear," "upper," "lower," "upwardly," "downwardly," and other orientational descriptors are intended to facilitate the description of the cutting tool, and are not intended to limit the structure of the cutting tool to any particular position or orientation.

BRIEF DESCRIPTION OF THE DRAWINGS

The above aspects and features of the present invention will be more apparent from the description for exemplary embodiments of the present invention taken with reference to the accompanying drawing figures, in which:

FIG. 7 is a perspective view of the drive pinion gear of a engaging the teeth of the movable cutting blade of FIG. 1 in which a return pinion gear is removed for clarity;

Throughout the drawings, like reference numerals will be understood to refer to like parts, components and structures.

DETAILED DESCRIPTION OF EXEMPLARY EMBODIMENTS

As shown in FIGS. 1-10, a cutting tool 11 in accordance with a first exemplary embodiment of the present invention includes a movable cutting blade 12, a fixed cutting blade 13 and a second spring member 14 connected to the movable cutting blade. During a cutting procedure, the movable cutting blade 12 is rotated relative to the fixed cutting blade 13 to cut an object, such as a cable, disposed therebetween. As the movable cutting blade 12 is rotated from a first position shown in FIGS. 1 and 7 to a second position shown in FIG. 8, the spring member 14 (FIG. 10) stores rotational energy. Releasing the stored rotational energy of the spring member 14 causes the movable cutting blade 12 to quickly return to the first position.

Figure 1:
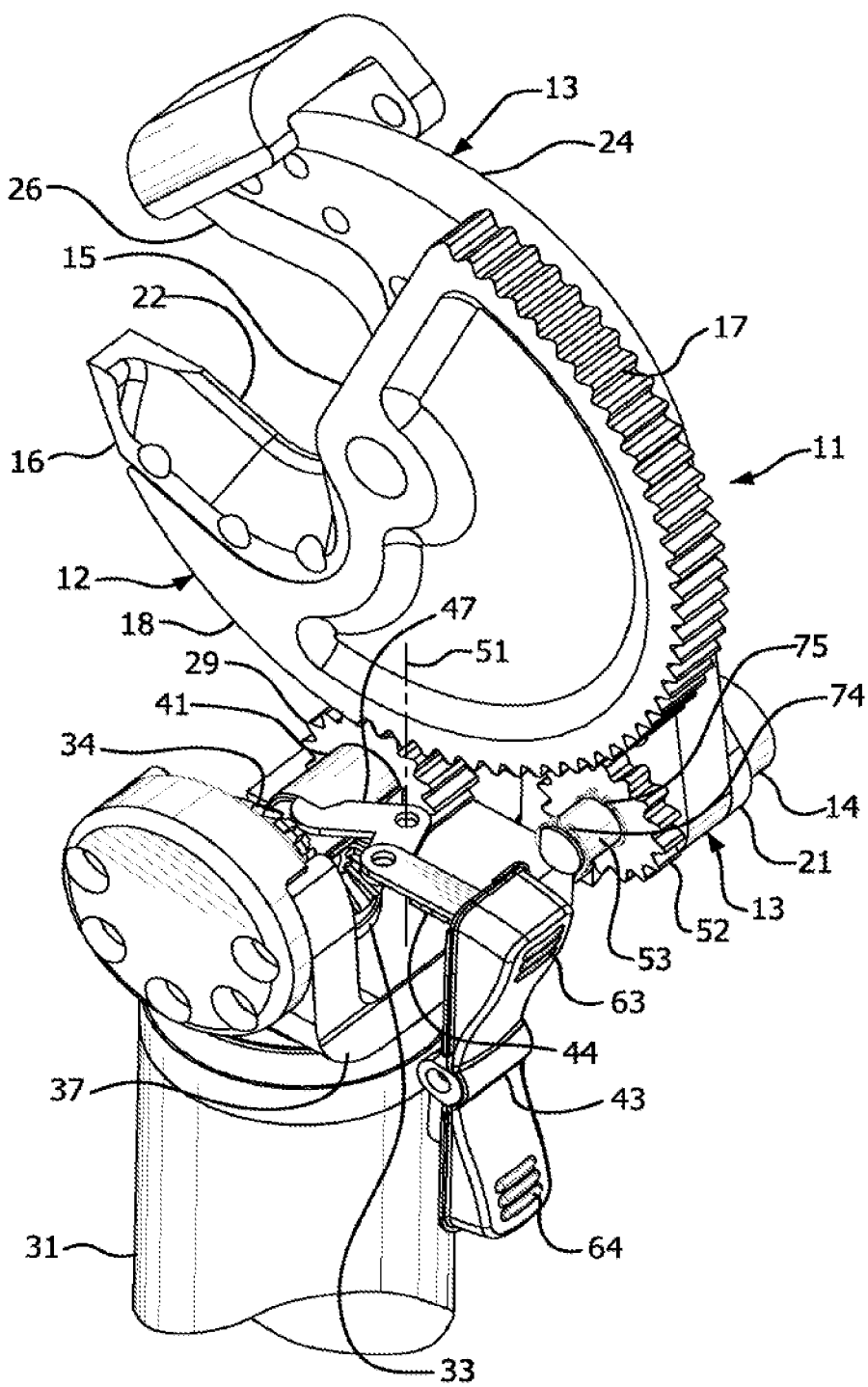
FIG. 1 is a right side perspective view of the cutting tool in accordance with a first exemplary embodiment of the present invention in which a drive pinion gear engages teeth of a movable cutting blade.
Figure 3:
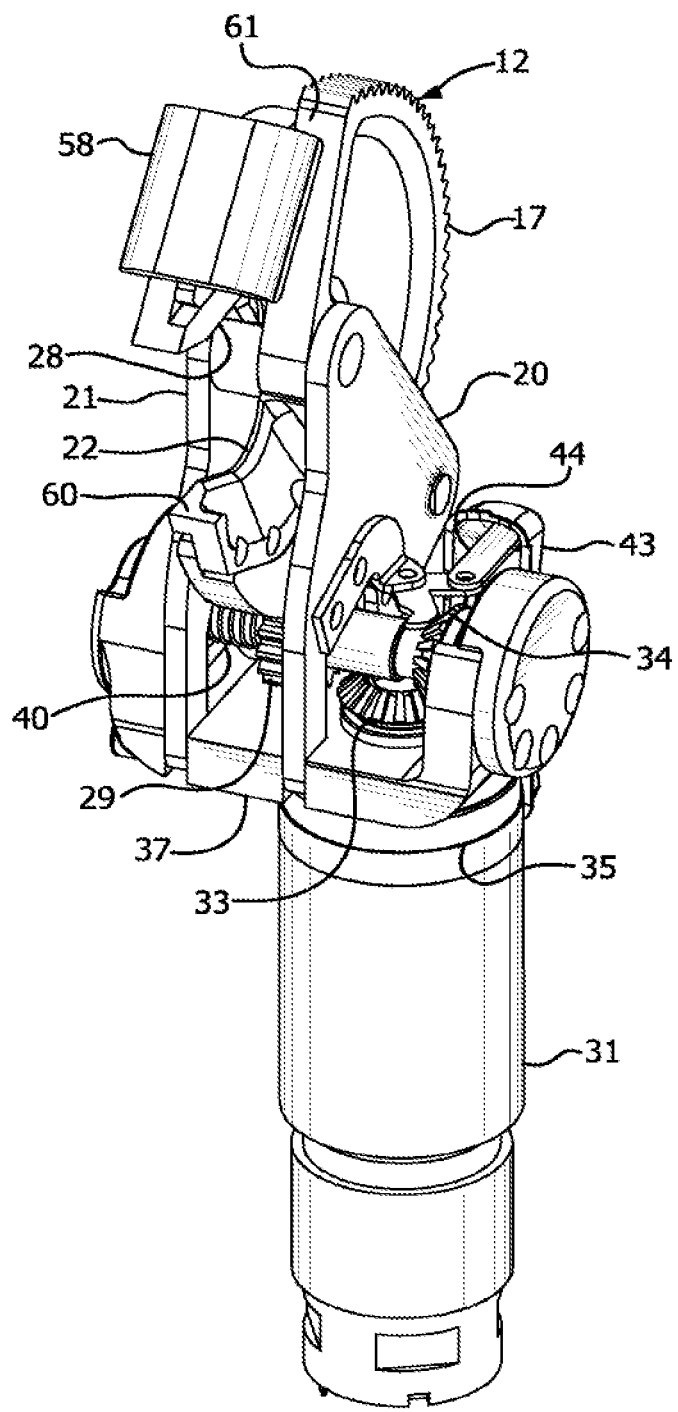
FIG. 3 is a front perspective view of the cutting tool of FIG. 1.
Figure 4:
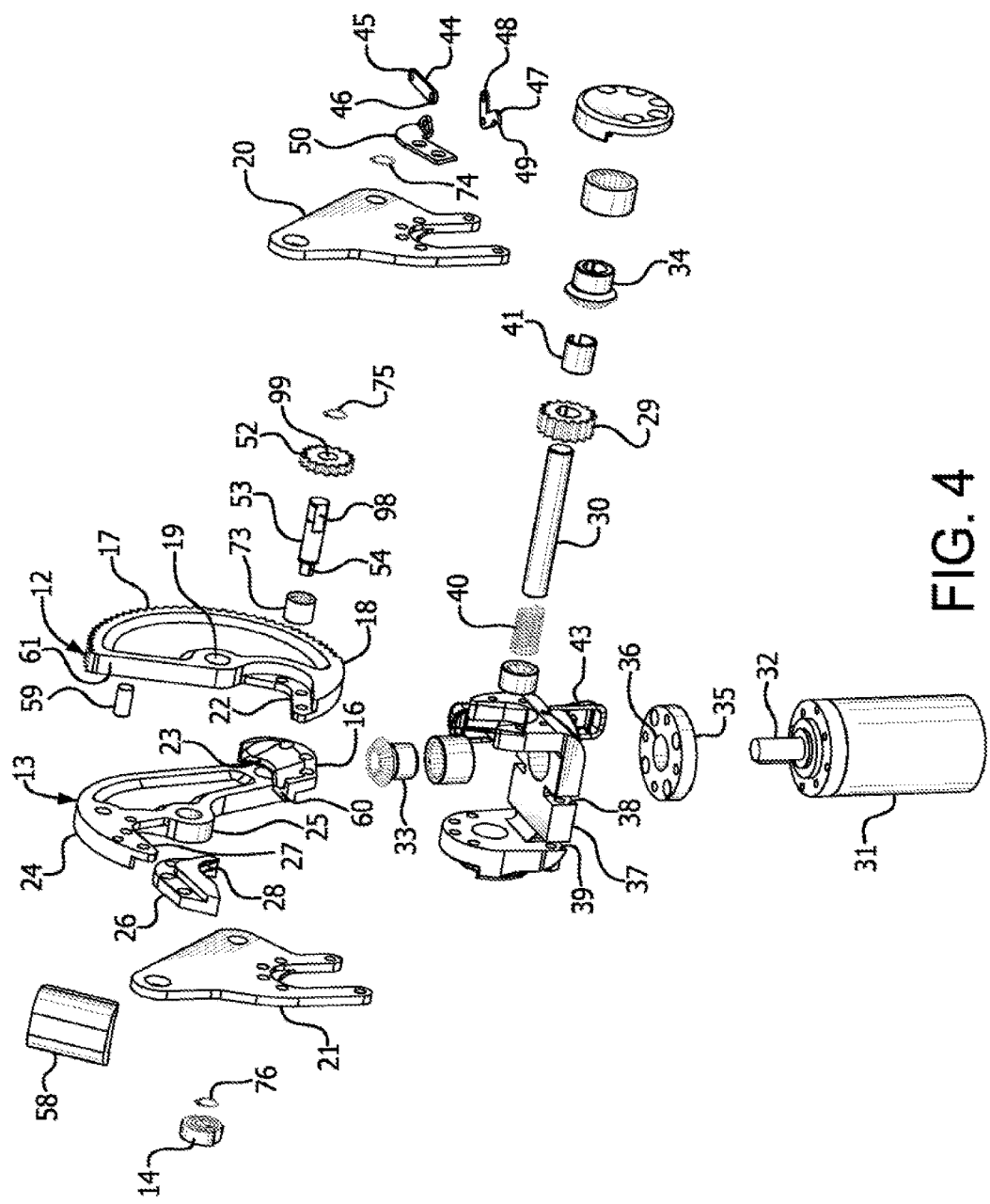
FIG. 4 is an exploded perspective view of the cutting tool of FIG. 1.

The movable cutting blade 12 has an inner edge 15 and an outer edge 18, as shown in FIGS. 1 and 4. The inner edge 15 of the movable cutting blade 12 has a first cutting member 16. As shown in FIG. 4, the first cutting member 16 is preferably removably connected to a first mounting portion 22 of the movable blade 12, such as by fasteners. The first cutting member 16 has a first cutting surface 23 to facilitate cutting an object, such as a cable. A plurality of teeth 17 are formed on an outer, semi-cylindrical edge 18 of the movable cutting blade 12. Preferably, the plurality of teeth 17 extend along a majority of the outer edge 18 of the movable blade 12. An opening 19 in the movable cutting blade 12 receives a pin (not shown) to rotatably mount the movable cutting blade between first and second frame plates 20 and 21, as shown in FIGS. 3 and 4. The first cutting member 16 is preferably removably connected to a first mounting portion 22, as shown in FIG. 4, of the movable blade 12, such as by fasteners. Alternatively, the first cutting member 16 can be connected to the movable blade 12 in any suitable manner.

The fixed cutting blade 13 has an inner edge 24 and an outer edge 25, as shown in FIGS. 1 and 4. The inner edge 24 of the fixed blade 13 has a second cutting member 26. As shown in FIG. 4, the second cutting member 26 is preferably removably connected to a second mounting portion 27 of the fixed blade 13, such as by fasteners. The second cutting member 26 has a second cutting surface 28 to facilitate cutting an object disposed between the first and second cutting surfaces 23 and 28. Alternatively, the second cutting member 26 can be connected to the fixed blade 13 in any suitable manner.

A drive pinion gear 29 is non-rotatably, but axially movably, mounted on a drive shaft 30, as shown in FIG. 4, to rotate with rotation of the drive shaft 30. A motor 31 rotates a motor shaft 32 on which a first bevel gear 33 is mounted. A second bevel gear 34 is disposed on the drive shaft 30 such that rotation of the motor shaft 32 causes rotation of the drive shaft 30, which is mounted at approximately 90 degrees to the motor shaft 32. The drive shaft 30 has splines to facilitate non-rotatably mounting the drive pinion gear 29 and second bevel gear 34 thereon. Accordingly, bores in the drive pinion gear 29 and the second bevel gear 34 have splines, as shown in FIG. 4. Alternatively, the drive pinion shaft 30, drive pinion gear 29 and second bevel gear 34 can be keyed to facilitate non-rotatably mounting the drive pinion gear and the second bevel gear on the drive pinion shaft.

A mounting plate 35 is fixedly connected to the motor 31 and has an opening 36 through which the motor shaft 32 rotatably extends. A frame 37 is connected to the mounting plate 35 and has first and second pairs of recesses 38 and 39. The first frame plate 20 is received by the first pair of recesses 38 and the second frame plate 21 is received by the second pair of recesses 39, as shown in FIGS. 4 and 5, to mount the first and second frame plates to the frame 37.

Figures 5, 6:
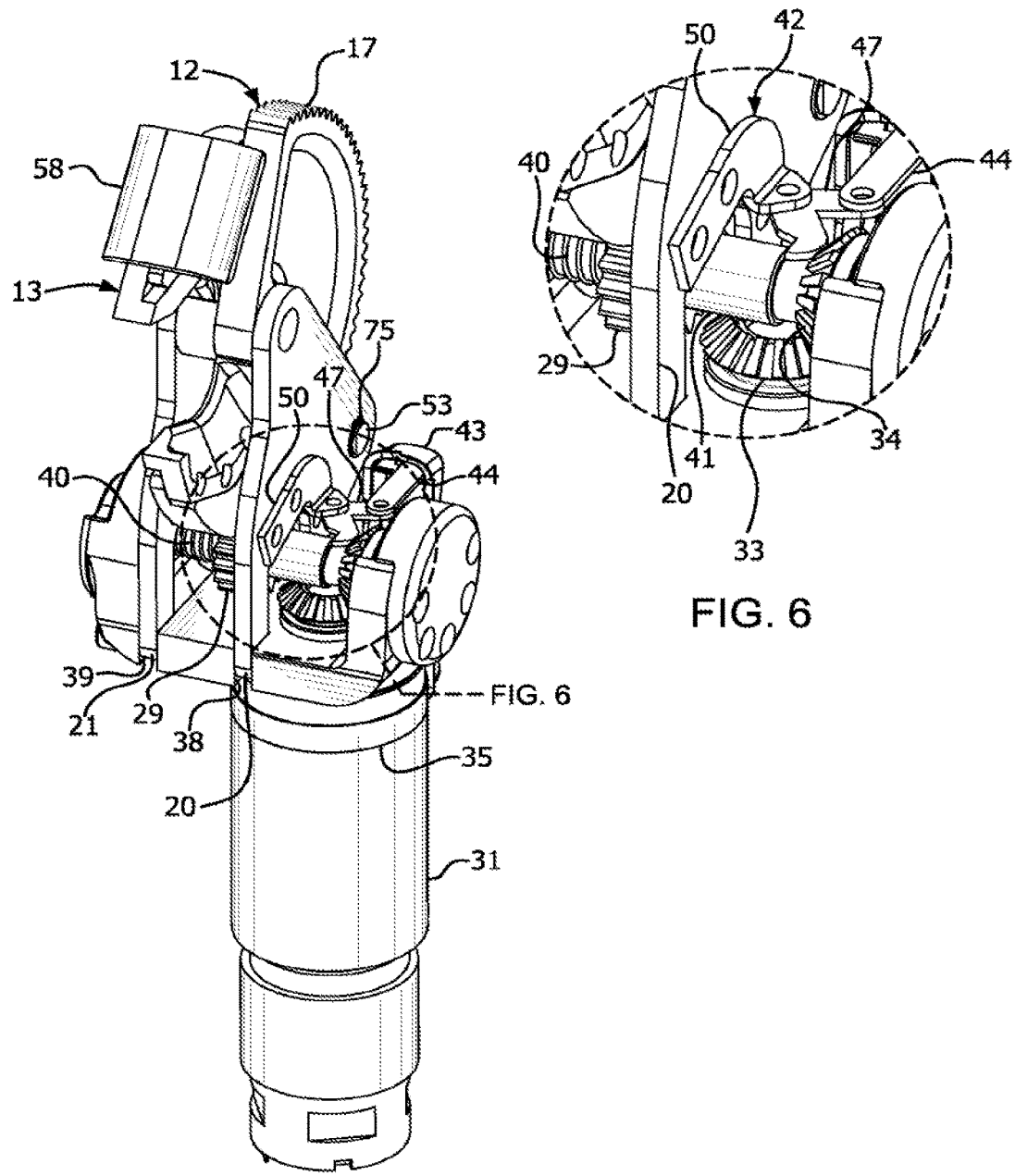
FIG. 5 is a front perspective view of the cutting tool of FIG. 1.
FIG. 6 is a partial enlarged perspective view of a linking arm engaging a drive pinion gear shaft of FIG. 5.

A first or drive spring member 40 is disposed on the drive shaft 30 on one side of the drive pinion gear 29, as shown in FIG. 5. Preferably, the first spring member 40 is a compression spring. A sleeve 41 is disposed on the drive shaft 30 on the opposite side of the drive pinion gear 29 than the first spring member 40. The drive pinion gear 29 is movable on the drive shaft 30 along the longitudinal axis 57 between a first position shown in FIGS. 7 and 9 in which the drive pinion gear 29 engages the plurality of teeth 17 of the movable blade 12 and a second position shown in FIG. 8 in which the drive pinion gear 29 is disengaged from the plurality of teeth 17 of the movable blade 12. The first spring member 40 biases the drive pinion gear 29 to the first position.

Figure 8:
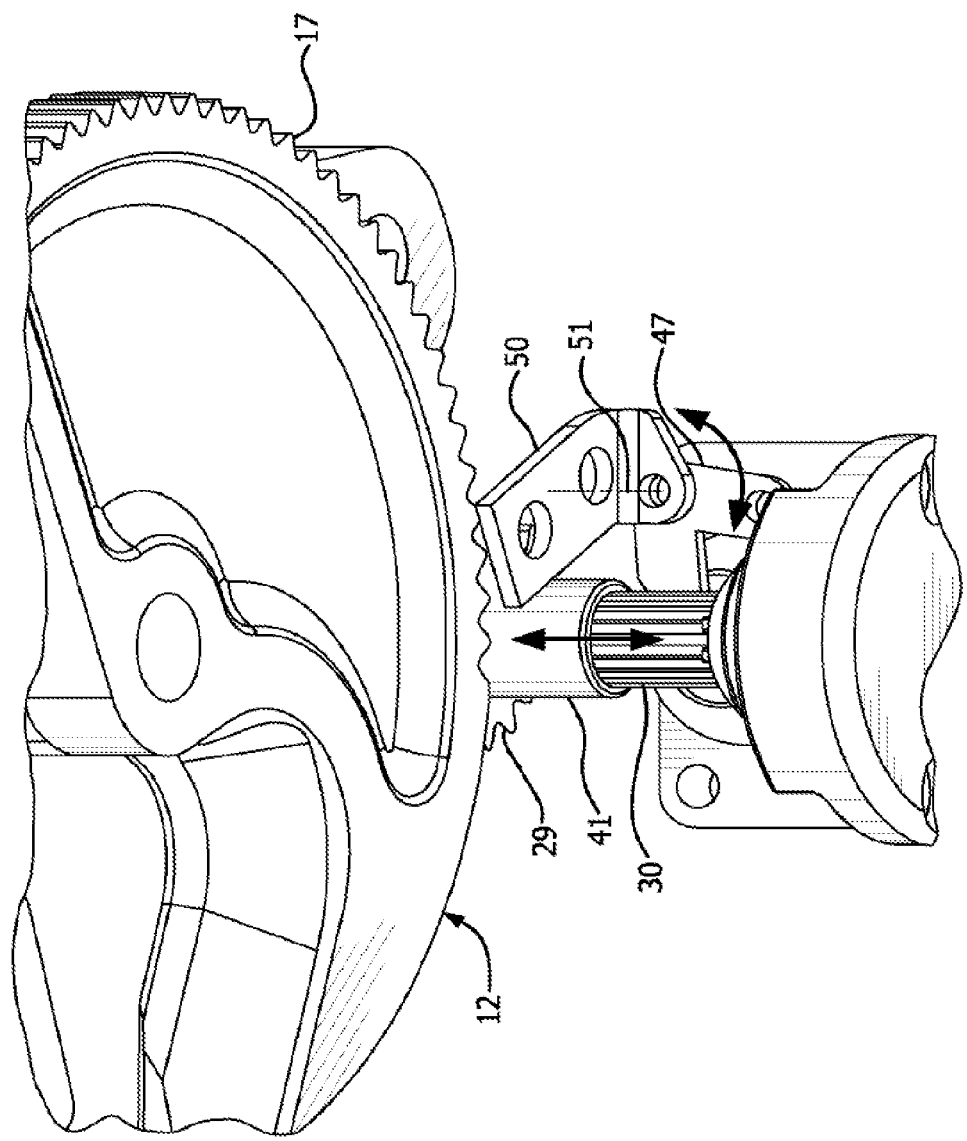
FIG. 8 is a perspective view of the drive pinion gear disengaged from the teeth of the movable cutting blade of FIG. 1 in which a return pinion gear is removed for clarity.
Figure 9:
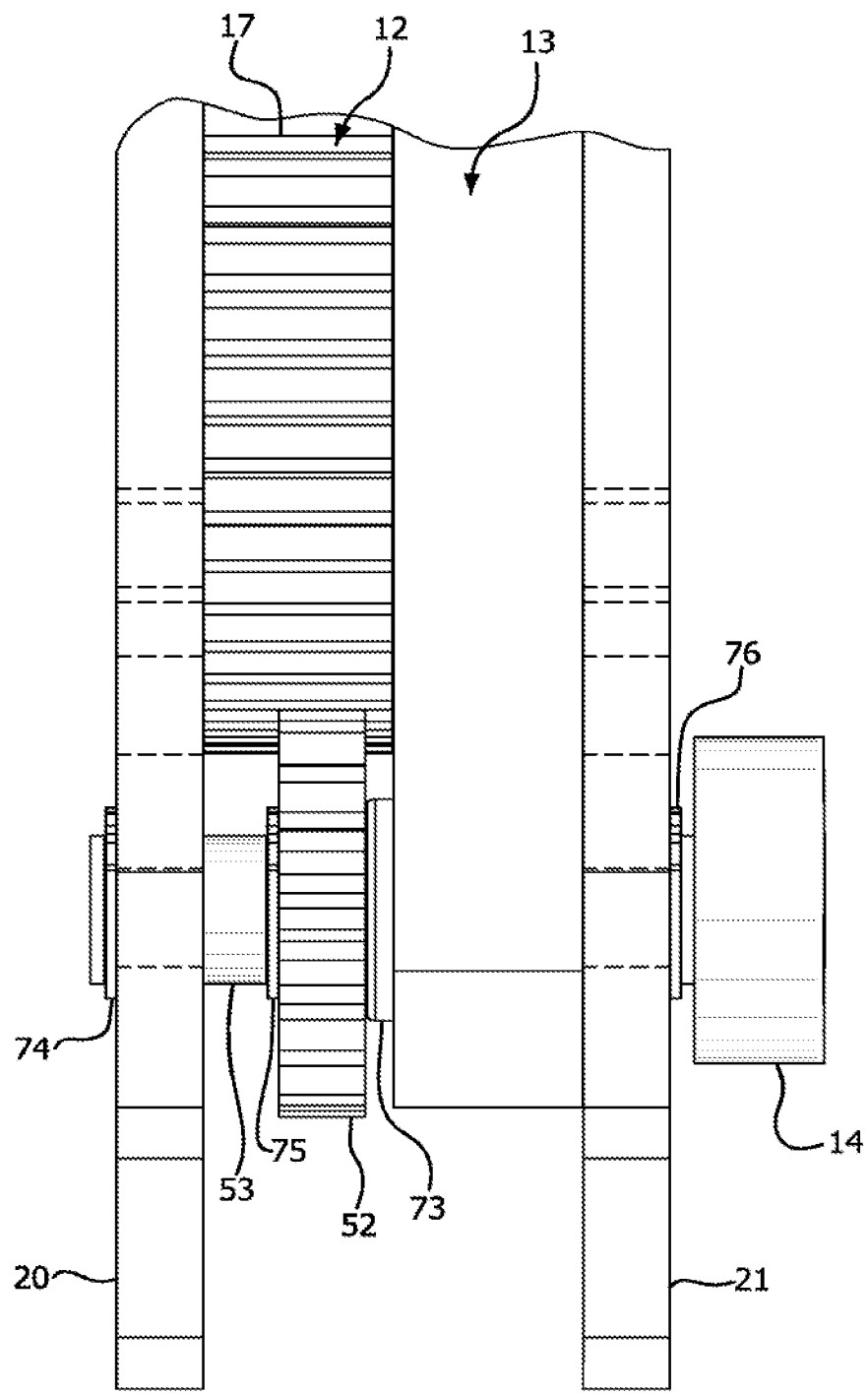
FIG. 9 is a top plan view of a return pinion shaft of FIG. 2.

A linkage assembly 42 is connected between a trigger 43 and the sleeve 41, as shown in FIGS. 4-6. The linkage assembly 42 includes a first linking arm 44 having a first end 45 and a second end 46. Preferably, the first linking arm 44 is substantially linear. The first end 45 is fixedly connected to the trigger 43, such as by a pin connection (not shown), and the second end 46 is connected to a first end 48 of a second linking arm 47. Preferably, the second linking arm 47 is substantially L-shaped. A second end 49 of the second linking arm 47 engages the sleeve 41 on the drive shaft 30. Preferably, a hook is formed at the second end 49 of the second linking arm 47 to facilitate engaging the sleeve 41. A third linking arm 50 is fixed to the first frame plate 20. The second linking arm 47 is connected to the third linking arm 50 between the first and second ends 48 and 49 thereof such that linear movement of the first linking arm 44 results in rotation of the second linking arm 48 about a rotation axis 51 at the connection point to the third linking arm 50, as shown in FIGS. 7 and 8. As shown in FIGS. 1-6, the second linking arm 48 engages the sleeve 41 above the drive shaft 30. Alternatively, as shown in FIGS. 7 and 8, the second linking arm 48 engages the sleeve 41 below the drive shaft 30.

Figure 2:
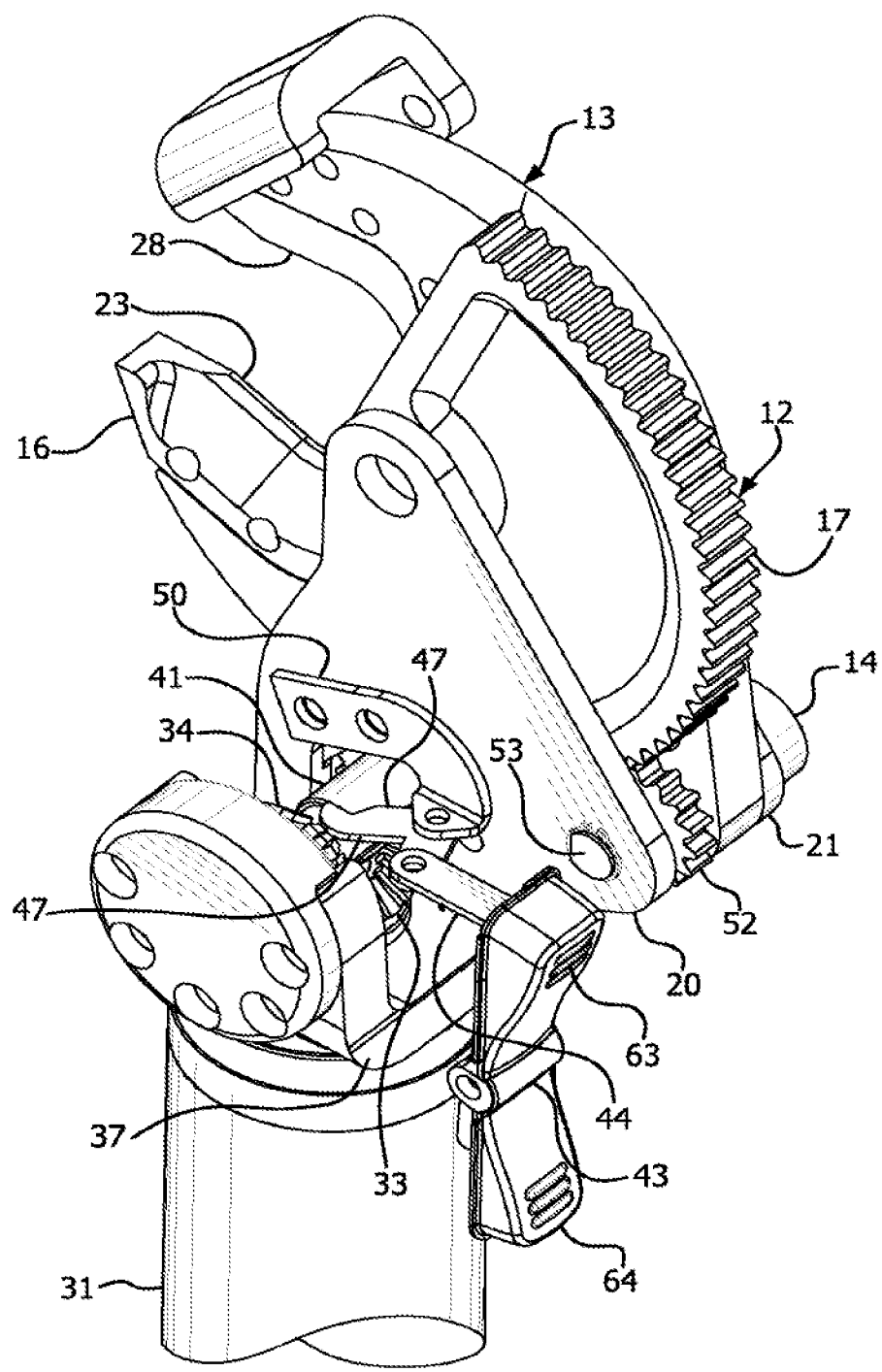
FIG. 2 is a right side perspective view of the cutting tool of FIG. 1 with frame plates connected thereto.

A return pinion gear 52 is non-rotatably mounted on a return shaft 53 to rotate with the return shaft, as shown in FIGS. 2 and 4. The return pinion gear 52 and the return shaft 53 are preferably keyed to prevent rotation of the return pinion gear 52 on the return shaft 53. As shown in FIG. 4, the return shaft 53 has a flat portion 98 engaged by a flat portion 99 of an aperture of the return pinion gear 52 thereby preventing rotation of the return pinion gear on the return shaft. Alternatively, the return pinion gear 52 and the return shaft can be splined to prevent rotation therebetween. Any suitable method can be used to prevent rotation of the return pinion gear 52 with respect to the return pinion shaft 53.

The return pinion gear 52 is disposed between the first and second frame plates 20 and 21. The return pinion gear 52 engages the plurality of teeth 17 of the movable blade 12. The second or return spring member 14 is disposed on the return shaft 53 on an opposite side of the second frame plate 21 from the return pinion gear 52. A first end 55 of the second spring member 14 is received by a slot 54 in the return shaft 53. A second end 56 of the second spring member 14 is fixed to the second frame plate 21, such as to a pin 71. Preferably, the second spring member 14 is a torsion spring. Accordingly, rotation of the second spring member 14 causes rotational energy to be stored therein. A bearing member 73 is disposed in the fixed blade 13 to allow the return shaft 53 to pass therethrough while allowing the return shaft 53 to rotate relative to the fixed blade 13.

Figure 11:
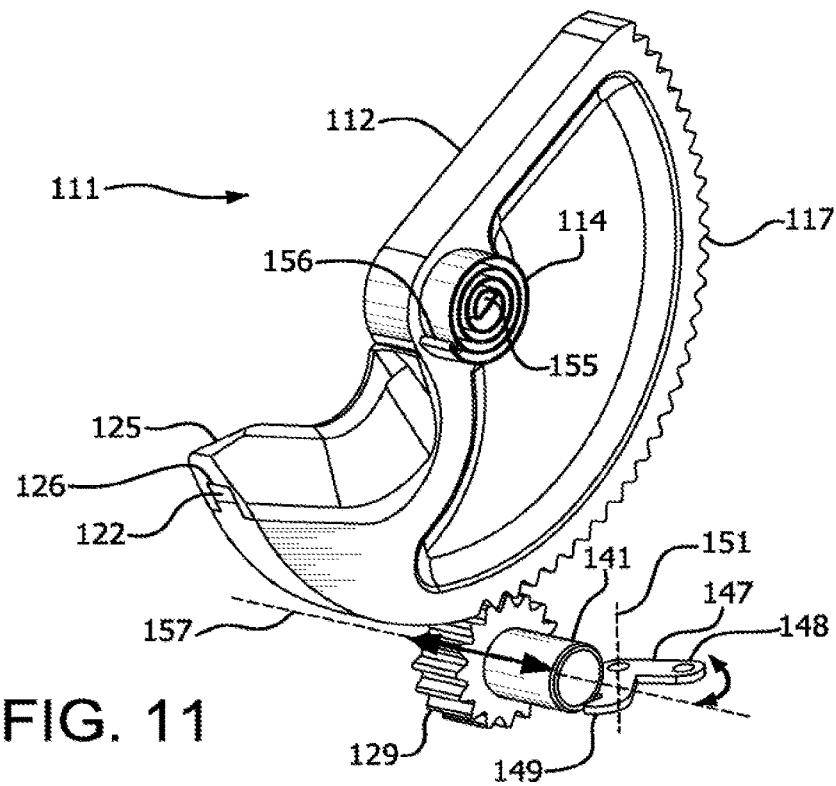
FIG. 11 is a perspective view of a cutting tool in accordance with a second exemplary embodiment of the present invention in which a drive pinion gear engages teeth of a movable cutting blade and in which frame plates are removed for clarity.

A plurality of snap rings 74, 75 and 76 are disposed on the return shaft 53 to prevent axial movement of the return shaft 53, as shown in FIGS. 4 and 11. The first snap ring 74 prevents axial movement of the return shaft 53 to the right as shown in FIG. 11. The second snap ring 75 prevents axial movement of the return pinion gear 52, which is disposed on the return shaft 53 between the second snap ring 75 and the bearing member 73. The third snap ring 76 prevents movement of the return shaft 53 to the left and maintains the position of the bearing member 73 between the return pinion gear 52 and the third snap ring 76.

A blade guide 58 is connected to the fixed blade 13, as shown in FIGS. 3 and 4, to maintain alignment of the blades 12 and 13. A stop member 59 is connected to the fixed blade 13 and the blade guide 58 to prevent further rotation of the movable blade 12. During the cutting process, a first end 60 of the first cutting member 16 of the movable blade 12 abuts the stop member 59 such that further rotation of the movable blade 12 in the cutting direction is prevented, as shown in FIG. 4. When the movable blade 12 is returned to its initial position, a second end 61 of the movable blade 12 abuts the stop member 59 thereby preventing further rotation in the return direction.

Operation

The cutting tool 11 in accordance with the first exemplary embodiment of the present invention provides a quick return of the movable cutting blade 12 to a first, or receiving, position after using the tool to cut an object, such as a cable. Accordingly, the movable blade 12 is quickly returned to the first position such that another cutting process can be performed.

The movable blade 12 is shown in a first, or receiving, position in FIGS. 5 and 7. The first spring member 40 biases the drive pinion gear 29 and the sleeve 41 to their respective first positions, as shown in FIG. 5. The drive pinion gear 29 is in a first position engaged with the plurality of teeth 17 of the movable blade 12. The return pinion gear 52 is engaged with the plurality of teeth 17 of the movable blade 12, as shown in FIG. 2.

To cut an object positioned between the movable and fixed cutting blades 12 and 13, electrical power is supplied to the motor 31 to rotate the motor shaft 32. First and second bevel gears 33 and 34 translate the rotation of the motor shaft 32 ninety degrees to rotate the drive shaft 30. The drive pinion gear 29 rotates with the drive shaft 30. The plurality of teeth 17 of the movable cutting blade 12 are engaged with the first pinion gear 29, such that rotation of the pinion gear 29 rotates the movable cutting blade in a cutting direction from a first or receiving position in which the first cutting surface 23 is spaced from the second cutting surface 28 to a second or cutting position in which an object disposed between the first and second cutting surfaces 23 and 28 is cut. A first end 60 of the movable cutting blade 12 abuts the stop member 59 to prevent further rotation of the movable cutting blade in the cutting direction. A load limiter electrically connected to a wiring harness or circuit board electrically connected to the motor 31 prevents excess force from being exerted by the movable cutting blade 12 on the stop member 59 by stopping the supply of power to the motor 31.

Figure 12:
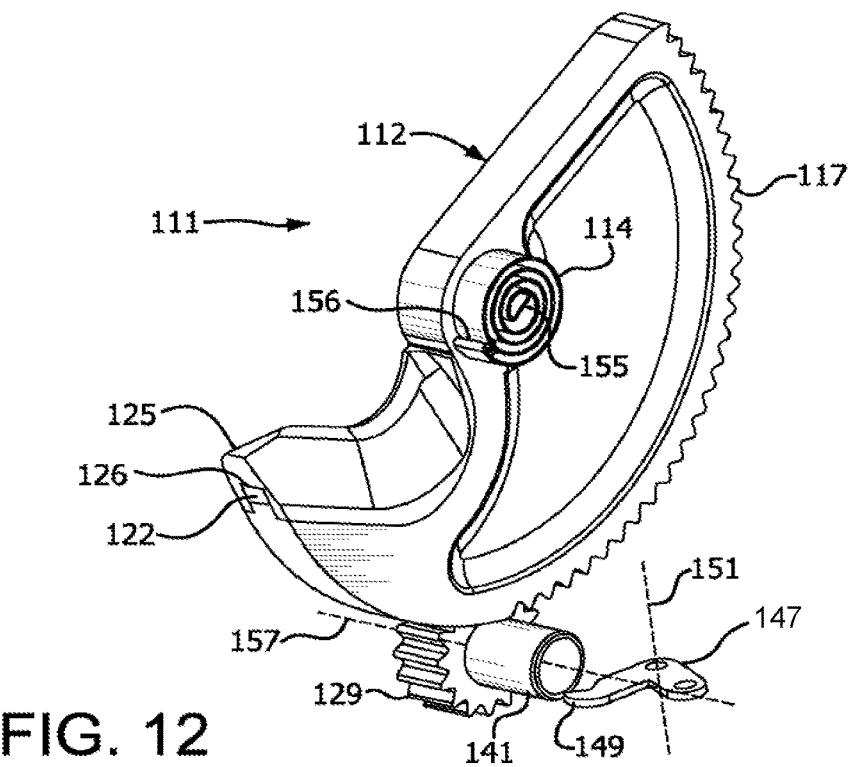
FIG. 12 is a perspective view of the cutting tool of FIG. 11 in which the drive pinion gear is disengaged from teeth of the movable cutting blade.

The rotation of the movable cutting blade 12 rotates the return pinion gear 52. The rotation of the return pinion gear 52 rotates the return shaft 53 in a first direction. The first end 55 of the second spring member 14 is fixed to the return shaft 53 and the second end 56 is fixed to a pin 71 connected to the second frame plate 21, as shown in FIG. 12, such that rotation of the return shaft 53 stores energy in the second spring member 14.

Figure 10:
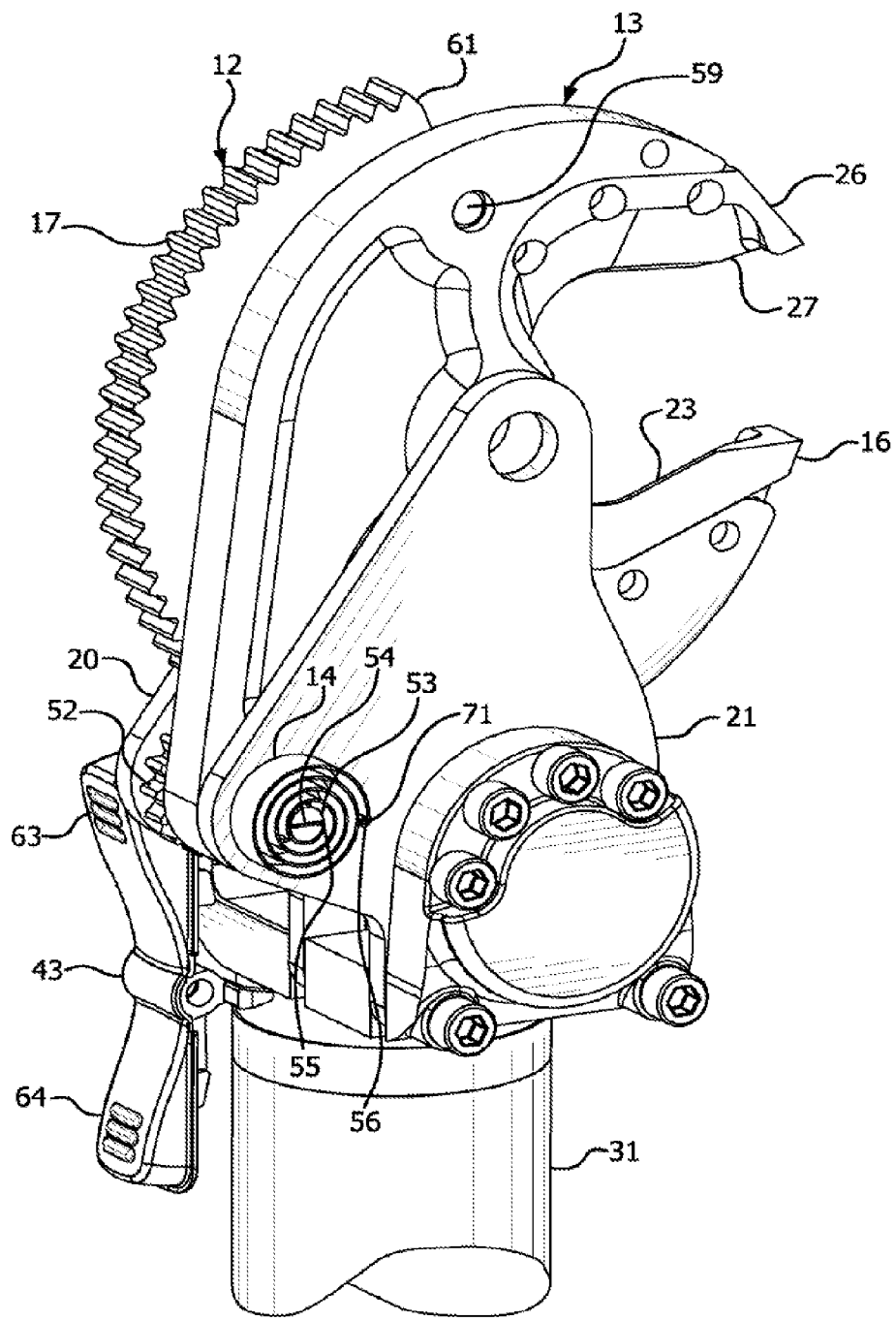
FIG. 10 is a left side perspective view of the cutting tool of FIG. 1.

When the object has been cut, the user presses an upper portion 63 of the trigger 43. The movement of the upper portion 63 of the trigger 43 moves the first linking arm 44 inwardly. The linear movement inwardly of the first linking arm 44 rotates the second linking arm 47 about its rotation axis 51, as shown in FIG. 10. The rotation of the second linking arm 47 causes the second end 49 thereof to abut the sleeve 41, thereby moving the sleeve on the longitudinal axis to a second position. The linear movement of the sleeve 41 pushes the drive pinion gear 29 along the longitudinal axis to a second position in which the drive pinion gear 29 is disengaged from the teeth 17 of the movable cutting blade 12. The movement of the drive pinion gear 29 compresses the first spring member 40.

When the drive pinion gear 29 is disengaged from the teeth 17 of the movable blade 12, the motor 31 no longer rotates the movable blade 12. Accordingly, the return shaft 53 is also no longer rotated. This allows the second spring member 14 to release the stored rotational energy, which rotates the return shaft 53 in a second direction opposite to the first direction in which the return shaft was rotated during the cutting process. The rotation of the return shaft 53 rotates the return pinion gear 52 in a direction opposite to the direction in which the return pinion gear rotates during the cutting process. The movable cutting blade 12 is rotated in a return direction (opposite to the cutting direction) to its first position. The second end 61 of the movable cutting blade 12 abuts the stop member 59, thereby preventing further rotation in the return direction. Accordingly, the second spring member 14 quickly returns the movable cutting blade 12 to its first position after cutting an object.

When the movable blade 12 has returned to the first position, the user manually presses the lower portion 64 of the trigger 43 to move the first linking arm 44 linearly outwardly. The second linking arm 47 rotates about the rotational axis to move the second end 49 away from the sleeve 41. The first spring member 40 expands to its initial position, thereby moving the drive pinion gear 29 and the sleeve 41 on the drive shaft 30 along the longitudinal axis. The sleeve 41 is moved on the drive shaft 30 until it abuts the second end 49 of the second linking arm 47. The drive pinion gear 29 engages the plurality of teeth 17 of the movable cutting blade 12. The cutting tool 11 is in position to perform another cutting operation.

Second Exemplary Embodiment

Figure 13:
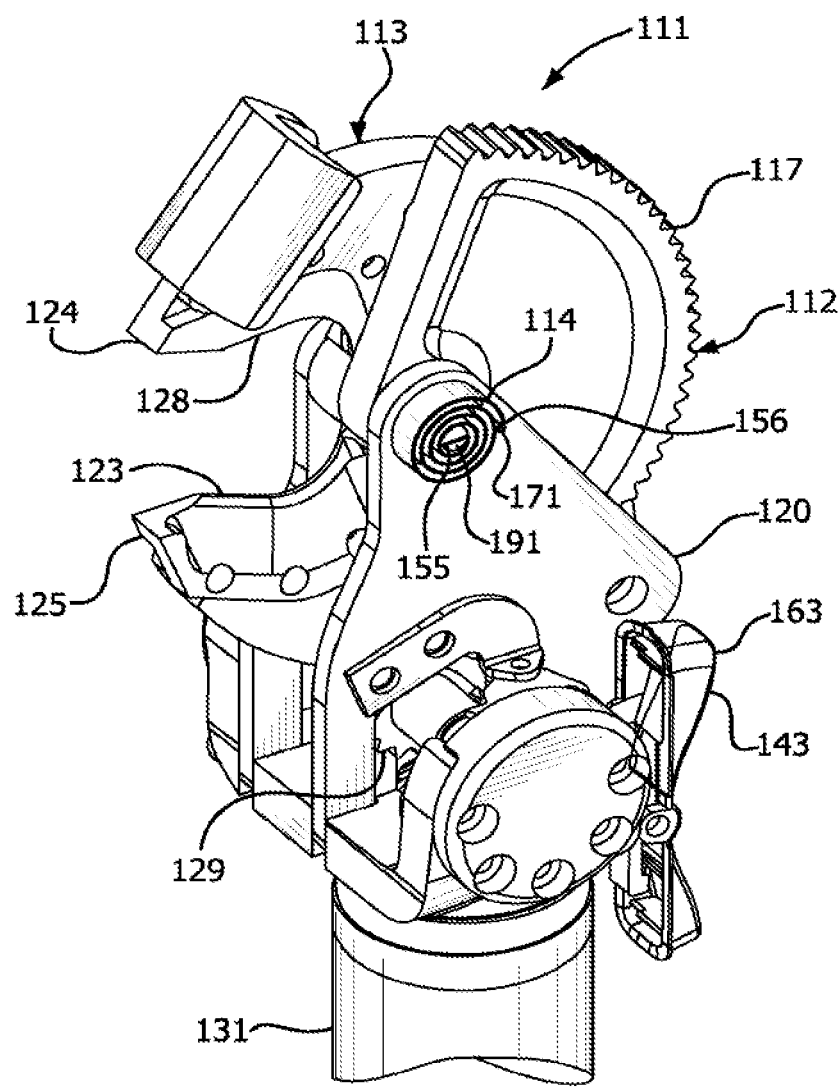
FIG. 13 is a perspective view of the cutting tool of FIG. 11 with frame plates connected thereto.

A second exemplary embodiment of the cutting tool 111 of the present invention is shown in FIGS. 11-13. Operation of the second exemplary embodiment of the cutting tool 111 is substantially similar to the operation of the cutting tool 11 of the first exemplary embodiment, except that the cutting tool 111 of the second exemplary embodiment does not use a return pinion gear 52 to rotate a movable cutting blade 112 to a first position, as shown in FIG. 13. The cutting tool 111 in accordance with the second exemplary embodiment of the present invention provides a quick return of the movable cutting blade 112 to a first or receiving position after using the tool to cut an object, such as a cable. Accordingly, the movable blade 112 is quickly returned to the first position such that another cutting process can be performed.

The movable blade 112 is shown in a first, or receiving, position in FIG. 13. The drive pinion gear 129 is in a first position engaged with the plurality of teeth 117 of the movable blade 112. As shown in FIGS. 11 and 12, a first cutting member 125 has a groove 126 for removably receiving the first mounting portion 122 of the movable cutting blade 112. The fixed cutting blade 113 can be similarly configured. Alternatively, the first and second cutting members 125 and 124 can be secured to the movable and fixed cutting blades 112 and 113 in any suitable manner, such as with fasteners as shown in FIG. 13.

As shown in FIG. 13, a cutting blade shaft 191 is rotatably mounted to a first frame plate 120. The movable cutting blade 112 is fixed to the cutting blade shaft 191 such that the movable cutting blade 112 rotates with the cutting blade shaft 191. The fixed cutting blade 113 is mounted on and prevented from rotating with the cutting blade shaft 191.

A return spring member 114 is mounted on the cutting blade shaft 191, as shown in FIG. 13. A first end 155 of the return spring member 114 is fixed to the cutting blade shaft 191 and a second end 156 of the return spring member 114 is fixed to a pin 171 connected to a first frame plate 120, such that rotation of the cutting blade shaft 191 stores energy in the return spring member 114. The return spring member 114 is preferably a torsion spring.

Cutting an object positioned between the movable and fixed cutting blades 112 and 113 is substantially similar to the process described with respect to the cutting tool 11 of the first exemplary embodiment. Electrical power is supplied to the motor 131 to rotate the motor shaft 32 (FIG. 4), which rotates the drive pinion gear 129. The plurality of teeth 117 of the movable cutting blade 112 are engaged with the drive pinion gear 129, as shown in FIG. 11, such that rotation of the drive pinion gear 129 rotates the movable cutting blade 112 in a cutting direction from a first, or receiving, position in which a first cutting surface 123 of the movable cutting blade 112 is spaced from a second cutting surface 128 of the fixed cutting blade 113 to a second, or cutting, position in which an object disposed between the first and second cutting surfaces 123 and 128 is cut.

The rotation of the movable cutting blade 112 rotates the cutting blade shaft 191 on which the movable cutting blade 112 is fixedly mounted. The first end 155 of the return spring member 114 rotates with the cutting blade shaft 191 and with respect to the fixed second end 156 of the return spring member 114, thereby twisting the second spring member 114 tighter and storing energy therein.

When the object has been cut, the user presses an upper portion 163 of the trigger 143. The movement of the upper portion 163 of the trigger 143 moves the first linking arm 44 (FIG. 5) inwardly. The linear movement inwardly of the first linking arm 44 (FIG. 5) rotates the second linking arm 147 about its rotation axis 151, as shown in FIGS. 11 and 12. The rotation of the second linking arm 147 causes the second end 149 thereof to abut the sleeve 141, thereby moving the sleeve 141 on the longitudinal axis 157 to a second position as shown in FIG. 12. The linear movement of the sleeve 141 pushes the drive pinion gear 129 along the longitudinal axis 157 to a second position in which the drive pinion gear 129 is disengaged from the teeth 117 of the movable cutting blade 112.

When the drive pinion gear 129 is disengaged from the teeth 117 of the movable blade 112, the motor 31 (FIG. 4) no longer rotates the movable blade 112. Accordingly, the cutting blade shaft 191 is also no longer rotated. This allows the return spring member 114 to release the stored rotational energy, which rotates the cutting blade shaft 191 in a second direction opposite to the first direction in which the cutting blade shaft 191 was rotated during the cutting process. The movable cutting blade 112 is rotated in a return direction (opposite to the cutting direction) to its first position with the rotation of the cutting blade shaft 191 in the return direction. Accordingly, the return spring member 114 quickly returns the movable cutting blade 112 to its first position after cutting an object. The non-described portions of the cutting tool 111 in accordance with the second exemplary embodiment are structurally and operationally substantially similar to the cutting tool 11 of the first exemplary embodiment and are therefore not described again.

While advantageous embodiments have been chosen to illustrate the invention, it will be understood by those skilled in the art that various changes and modifications may be made therein without departing from the scope of the invention as defined in the appended claims.

What is claimed is:

1. A cutting tool, comprising:
   a fixed blade having a first cutting surface;
   a movable blade having a second cutting surface, said movable blade being rotatable between a first position in which said second cutting surface is spaced from said first cutting surface of said fixed blade and a second position in which an object disposed between said fixed and movable blades is cut by said first and second cutting surfaces;
   said movable blade has a plurality of teeth;
   a return pinion gear engages said plurality of teeth of said movable blade;
   a torsion spring connected to a shaft operatively connected to said return pinion gear whereby rotation of said movable blade to said second position causes compression of said torsion spring and upon releasing said compression said torsion spring rotates said movable blade back to said first position.

2. The cutting tool according to claim 1, further comprising:
   a drive pinion gear engages said plurality of teeth to move said movable blade from said first position to said second position.

3. The cutting tool according to claim 2, wherein
   said drive pinion gear is movable between said first and second positions, said drive pinion gear engaging said plurality of teeth in a drive position and disengaging said plurality of teeth in a return position.

4. The cutting tool according to claim 3, wherein
   a linking arm moves said drive pinion gear between said first and second positions.

5. The cutting tool according to claim 4, wherein
   a manually operated trigger is connected to said linking arm to control movement thereof.

6. A cutting tool, comprising:
   a fixed blade;
   a movable blade having a plurality of teeth and rotatable between a first position spaced from said fixed blade to receive an object therebetween and a second position adjacent said fixed blade to cut the object disposed between said fixed and movable blades;
   a drive pinion gear movable between a drive position engaging said plurality of teeth of said movable blade and a return position disengaged from said plurality of teeth, said drive pinion gear rotating said movable blade from said first position to said second position in said drive position;
   a torsion spring member connected to said movable blade whereby rotation of said movable blade from said first position to said second position compresses said torsion spring member and upon releasing said compression said torsion spring member rotates said movable blade back to said first position when said drive pinion is in the return position disengaged from said plurality of teeth, wherein a return pinion gear engages said plurality of teeth of said movable blade; and said drive pinion gear is mounted on a first shaft and said return pinion gear is mounted on a second shaft.

7. The cutting tool according to claim 6, wherein said torsion spring member is connected to said second shaft.

* * * * *